United States Patent [19]

Leo et al.

[11] 4,057,529

[45] Nov. 8, 1977

[54] RUBBER COMPOSITIONS HAVING IMPROVED ADHESION AFTER THERMAL AGING

[75] Inventors: Thomas J. Leo, Yardley, Pa.; Thomas N. Loser, Princeton, N.J.; Michael J. Reynolds, Morrisville, Pa.

[73] Assignee: Wyrough and Loser, Inc., Trenton, N.J.

[21] Appl. No.: 662,050

[22] Filed: Feb. 27, 1976

[51] Int. Cl.² .......................... C08K 3/20; C08K 5/09; C09K 15/04; C09K 15/32
[52] U.S. Cl. ........................ 260/42.47; 156/110 A; 156/124; 252/399; 252/400 A; 260/45.75 F; 260/45.75 M; 260/45.75 T; 260/762
[58] Field of Search ........................ 252/399, 400 R; 260/42.47, 45.75 M, 762, 45.75 T, 45.75 F; 156/110 A, 124

[56] References Cited

U.S. PATENT DOCUMENTS

| | | | |
|---|---|---|---|
| 3,296,242 | 1/1967 | Turner et al. | 260/448 R |
| 3,903,026 | 9/1975 | Fujimura et al. | 260/45.75 M |

*Primary Examiner*—Donald E. Czaja
*Assistant Examiner*—H. H. Fletcher
*Attorney, Agent, or Firm*—Edward S. Irons; James R. Laramie

[57] ABSTRACT

A rubber composition comprising a highly unsaturated rubber, a magnesium compound capable of donating electrons and a carboxylated cobalt oxy metal complex comprising at least one metal atom selected from Groups IIIA, IIIB, IVA, IVB, VA and VB of the Periodic Table, at least one cobalt atom, said metal and cobalt atoms being linked through oxygen atoms, at least one acyloxy radical attached to a cobalt atom, and any residual valences of said complex being satisfied by acyloxy, aryloxy or alkoxy radicals.

38 Claims, No Drawings

RUBBER COMPOSITIONS HAVING IMPROVED ADHESION AFTER THERMAL AGING

BACKGROUND OF THE INVENTION

1. Field of the Invention

The invention relates to a method for obtaining a high level of adhesion between rubber and metal and retaining such adhesion after thermal aging. More particularly, the invention relates to novel rubber compositions having a high level of adhesion to steel or steel plated with copper, zinc, copper alloys, zinc alloys, or copper and zinc alloys, and having improved thermal aging resistance.

2. Description of the Prior Art

It is essential during the manufacture of all rubber articles in which the rubber is reinforced with metal to provide a firm bond between the rubber composition and the metal. When reinforcing rubber articles such as tires, transmission belts, conveyor belts, hose and the like with metal wires, cords or plates, a high adhesion must be obtained between the rubber composition and the metal which must be retained after thermal aging to ensure the extended life and good performance of the rubber article.

Prior to the present invention, organic cobalt salts, such as cobalt salts of organic carboxylic acids, have been added to unsaturated rubbers, such as natural rubber, polyisoprene, polybutadiene and styrene-butadiene rubber, to provide adhesion between metal and the rubber composition. U.S. Pat. No. 3,514,370 discloses compounding lowly unsaturated rubbers with a cobalt salt of an organic carboxylic acid, such as cobalt naphthenate, cobalt oleate or cobalt stearate, to provide high adhesion to the metal surface. It has been found, however, that such rubber compositions lose adhesion upon thermal aging.

It has also been known that carboxylated divalent metal borates or aluminates such as those disclosed in U.S. Pat. No. 3,296,242 may be added to polymeric compositions as a stabilizer, or added to surface coatings as a drier. It has been found that when cobalt boron acyloxy compounds such as a carboxylated cobalt borate made in accordance with this patented process are compounded with rubber the adhesion between the rubber composition and a metal surface is greatly increased. These compositions likewise have a tendency to lose certain physical properties including adhesion as thermal aging proceeds.

Previously, metal oxides such as magnesium oxide and zinc oxide have been added to polymeric compositions to improve the retention of physical properties after thermal aging. Typical compositions are disclosed in U.S. Pat. Nos. 3,367,903 and 3,649,587. In addition, magnesium oxide has been added to rubber compounded with cobalt carboxylates such as those mentioned above to adhere the rubber composition to a metal surface. In U.S. Pat. No. 3,903,026, the rubber is compounded with a cobalt carboxylate and magnesium oxide to adhere the rubber composition to zinc or zinc alloy plated steel and to retain this adhesion after thermal aging. It was found, however, that these rubber compositions exhibit inferior original and thermally aged adhesions when, as is common, the metal surface varies in such characteristics as plating thickness, including bare spots, and alloy composition.

SUMMARY OF THE INVENTION

The disadvantages and limitations of the prior art are alleviated by the present invention. In accordance with the present invention, excellent adhesion of highly unsaturated rubber compositions to metal surfaces is obtained and such adhesion is retained after thermal aging by compounding the rubber composition with a magnesium compound and a carboxylated cobalt oxy complex of a metal selected from Groups IIIA, IIIB, IVA, IVB, VA and VB of the Periodic Table.

Rubber compositions made in accordance with the present invention adhere uniformly to metal surfaces having variations in plating, thickness, and alloy composition and retain such adhesion after thermal aging. Consequently, these rubber compositions are particularly well suited for use in the manufacture of metal-reinforced rubber articles, such as tires reinforced with steel or alloy-plated steel cords. The uniformity and retention of high adhesion obtained by the rubber compositions of the present invention ensures that tires made therefrom will perform with a greater degree of safety on the road.

DESCRIPTION OF THE PREFERRED EMBODIMENTS

In accordance with the present invention, a highly unsaturated rubber is compounded with a magnesium compound and a carboxylated cobalt oxy metal complex.

The highly unsaturated rubbers suitable for use in the practice of the present invention include natural rubber, polyisoprene, polybutadiene, styrene-butadiene copolymer, butadiene-acrylonitrile copolymer, polychloroprene rubbers and mixtures thereof, including polymer blends such as butadiene-acrylonitrile copolymer blended with polyvinyl chloride, and the like.

The magnesium compounds which may be added to the rubber compositions contemplated by the present invention include magnesium oxide, magnesium hydroxide and magnesium salts, such as magnesium carbonate. Since, as will be explained hereinafter, it is believed that the magnesium in these compounds is one of the factors responsible for the unexpected increase in the adhesive property, any functional electron donor similar in nature to those mentioned above may be used in the practice of the present invention with excellent results. Magnesium oxide is preferred, however, because the compound has a high magnesium content, approximately 60.3 percent, and it is a readily available chemical used in the rubber industry. The amount of magnesium compound which must be added to the rubber composition to obtain the improved adhesion properties of the present invention depends upon the magnesium content of the compound used but is generally only a relatively minor amount by weight of the total rubber composition. Generally, less than about 10 parts by weight of magnesium compound per hundred parts of rubber are employed, and preferably less than about 5 parts per hundred parts of rubber.

The rubber compositions of the present invention are compounded with a carboxylated cobalt oxy complex of a metal selected from Groups IIIA, IIIB, IVA, IVB, VA and VB of the Periodic Table. These complex carboxylated cobalt oxy metal compounds, such as the carboxylated cobalt borate, may be made by methods well known in the art, for example, by reacting a cobalt salt of a carboxylic acid with an alkoxide of boron as described in detail in U.S. Pat. No. 3,296,242, incorporated herein by reference. These complex metal compounds are believed to comprise at least one metal atom selected from the aforementioned group and at least one cobalt atom which are linked through oxygen atoms, at least one acyloxy radical attached to a cobalt atom, and any residual valences of the complex being satisfied by acyloxy, aryloxy or alkoxy radicals. These compounds are believed to have the structure set forth in the aforementioned patent. The preferred carboxylated cobalt oxy metal complex used with a magnesium compound in the practice of the present invention is the carboxylated cobalt borate having the structural formula

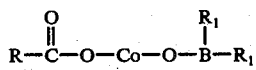

wherein R is a straight chain organic radical having at least 7 carbon atoms, preferably from 9 to 11 carbon atoms, and $R_1$ is an alkoxy, aryloxy, acyloxy or

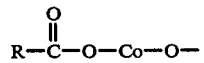

radical, or the structural formula

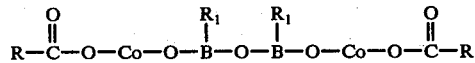

wherein R and $R_1$ have the meanings given above. If the reaction of the cobalt carboxylate with the alkoxide of boron is complete, $R_1$ will be an

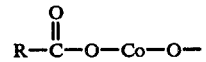

radical at all locations on the structural formulas set forth above and the boron atom will occupy a central position in the complex. It is this borate structure that enables the cobalt to be efficiently solubilized via the carboxylate group, since without the borate complex, each cobalt atom would be bonded to two carboxylate groups. Since at least 7 carbon atoms are needed to make the carboxylate group organophillic and compatible with the rubber, the carboxylate groups of necessity have a relatively high molecular weight. As a result, the total cobalt content is diluted. For example, boron which has an atomic weight of 10.8 can attach to 3 cobalt atoms via the oxy linkage. Although aluminum which has an atomic weight of 27 is not as efficient as boron, it is much more efficient than a cobalt carboxylate alone since it can be linked to 3 cobalt atoms. Similarly, a quadrivalent metal such as titanium having an atomic weight of 47.9 can be linked to 4 cobalt atoms via the oxy linkage. In general, only a relatively minor amount by weight of the complex metal compounds need to be added to the rubber composition, usually from about 0.5 to about 2.5 parts per hundred parts of rubber.

The metal surfaces to which the rubber compositions will remain firmly bonded even after thermal aging may be in the form of metal wires, cords, plates or similar reinforcing members, and may be made of steel, copper, zinc, copper alloys, zinc alloys, or copper and zinc alloys, or steel plated with copper, zinc, copper alloys, zinc alloys, or copper and zinc alloys. The steel cord used widely as reinforcement for rubber tires is generally plated with zinc or copper alloy. It has been found, however, that this steel cord often has variations in plating, thickness of plating, and alloy composition, including bare spots on the steel. Because of this non-uniformity of the reinforcing metal, the adhesion by the rubber compositions used prior to the present invention was also non-uniform. The rubber compositions of the present invention are particularly advantageous in this regard, since they obtain a high level of adhesion to all of the metal surfaces mentioned above and significantly retain such adhesion after thermal aging.

The rubber compositions of the present invention may additionally be compounded with conventional ingredients, fillers and additives, such as accelerators, vulcanizing agents, reinforcing agents, pigments, plasticizers, tackifying agents to provide "green tack," antidegradants, antioxidants and other processing aids.

When a carboxylated cobalt oxy metal complex is compounded with a highly unsaturated rubber, the adhesion between a metal surface and the rubber composition is increased and found to be uniform despite variations in such metal characteristics as plating, thickness of plating, and alloy composition, including bare spots on the metal. Such metal substrates include steel, copper, zinc, copper alloys, zinc alloys, or copper and zinc alloys. However, these rubber compositions tend to lose considerable adhesion after thermal aging. It was, therefore, quite unexpected to find that when a magnesium compound that acts as a Lewis base, i.e., donates electrons, is added to a rubber composition containing a carboxylated cobalt oxy complex of the metals specified above, a further increase in the level of adhesion is obtained and significantly retained after thermal aging. While it is not completely understood how such retention is achieved, it is believed to be caused by a novel complex compound of magnesium, cobalt carboxylate, and a metal selected from the group mentioned above which is formed in the practice of the present invention. Consequently, any of the magnesium compounds similar in nature to those mentioned above that are capable of donating electrons in order to form this novel complex may be compounded with the carboxylated cobalt oxy metal complex in order to obtain the good thermal aging characteristic in accordance with the present invention.

The carboxylated cobalt oxy metal complex and the magnesium compound may be added to the rubber composition separately or as a preblend of the two components. A preblend can be in the form of a cuttable paste, putty, bar, granules or dustless powder depending upon the initial form of each component and the ratio in which they are mixed. If the carboxylated cobalt oxy metal complex is in the form of a viscous liquid and the magnesium compound is in the form of a fine powder, preblending of the two components prior to their addition to the rubber composition has several advantages in that only one component has to be weighed and added to the rubber composition, the difficulties experienced in handling and accurately weighing precise and relatively small quantities of a viscous liquid are obviated, and the potential hazard to handlers and waste of material associated with fine powder dusting are eliminated.

If magnesium oxide powder is used as the magnesium compound, an additional difficulty is encountered. It is well known that upon exposure to atmospheric moisture, oxygen and carbon dioxide, magnesium oxide is readily converted to magnesium hydroxide and magnesium carbonate. Although both of these compounds may be used in the practice of the present invention, large hard agglomerates of particles are formed during the conversion which cannot be broken down in the rubber composition during the mixing step. The agglomerates that remain in the rubber composition can cause premature service failure of the composition, affecting both physical and adhesion properties detrimentally. Preblending the magnesium oxide powder with the carboxylated cobalt oxy metal complex in liquid form protects the magnesium compound from such atmospheric attack.

If the carboxylated cobalt oxy metal complex is in a solid form, it can still be preblended by adding sufficient process oil or plasticizer of the type which would be used in preparing the final rubber composition.

The preblends may also include additional components either functional or inert to adapt the final form of the composition to the desired end use. For example, functional components such as sulfur, insoluble sulfur, zinc oxide, hydrated silica, accelerators and carbon black, or nonfunctional diluents such as clay, other forms of silica and silicates may be added.

Preblending may be done using equipment well known in the art, such as ribbon blenders, high speed blenders, three-roll "ink" mills, mullers, extruders and granulating or chopping devices.

The amounts of carboxylated cobalt oxy metal complex and magnesium compound used to form the preblend are not critical and can be mixed in any ratio which has been found to yield advantageous results in the final rubber composition. It has been found, for example, that advantageous results can be obtained with a preblend of cobalt versatate-borate and magnesium oxide in the ratio of 1.5 to 2.0, respectively.

A more complete appreciation of the invention will be realized by reference to the following specific examples relating to specific compounds and rubber compositions and the processes for preparing them. The following examples are not intended to limit the invention disclosed herein except to the extent that limitations are specifically stated or to the extent to which limitations appear in the appended claims.

EXAMPLES 1 - 10

Ten separate rubber compositions were prepared and tested to determine the effect on their adhesion to metal surfaces of compounding the rubber with a carboxylated cobalt oxy metal complex alone and with the addition of a magnesium compound.

The ingredients of each of the rubber compositions set forth in Table I below were mixed on a 152 × 330 mm. (6 × 13 inches) laboratory two-roll mill in accordance with ASTM D 15-72-5 procedure. The lab mill was then used to prepare a stock sheet approximately 150 mm. wide and 6.4 mm. thick in accordance with ASTM D 15-8.1 taking care to immediately cover the surface of the stock which was against the mill roll with White Gold Seal grade Holland Cloth to protect the compound surface. The use of Holland Cloth makes it unnecessary to "refreshen" the compound surface when building the adhesion test block and ensures intimate compound steel cord contact.

Using a Monsanto TM-100 Oscillating Disc Rheometer equipped with micro-dies and rotor, the $T_c(90)$ "optimum cure" at 150° C. was established according to ASTM D 2084. The cure time for each composition was calculated using a factor of two times $T_c(90)$ plus 5 minutes. Experience has shown that this factor adequately compensates for the frictional forces of the ODR machine and the extra heat needed to adequately cure the 12.7 mm. thickness of the final test block.

The steel cord adhesion characteristics of each composition were determined in accordance with the ASTM D 2229 testing sequence. The calendered sheets were carefully cut into strips 6.4 × 12.8 × 152.4 mm. Two strips of each were used to make a 12.8 mm. sandwich block having the test steel cords spaced 13 mm. apart in the center of the block. The sides of the 12.8 mm. blocks were reinforced by curing a 10.0 × 145 × 0.25 mm. brass shim plate into the two lateral surfaces. These shim plates maintain the horizontal axis symmetry of the test samples and prevent "V-type" and "roof-type" sample distortion problems. Each test block was then cured in the ASTM D 2229-4.1 mold at 150° C. for the cure time previously calculated in an electric press as specified in ASTM D 15-9.1. Two test blocks were cured for each test composition.

The first of the test blocks cured was designated the original block and was aged in the 23° C. atmosphere of the test laboratory for at least 24 hours before testing in accordance with ASTM D 15-13.1. The second of the test blocks was placed in a circulating air oven maintained at 100° C. for 48 hours according to ASTM D 573. The purpose of the accelerated aging of the test block was to provide an indication of the effect of the heat service conditions of a tire casing on the compound/steel cord adhesion.

The force necessary to pull the steel cords linearly out of the test blocks was measured and reported as the adhesion strength in Newtons force in accordance with ASTM D 2229-4. Nine cords were pulled with the value reported in Table I below being the calculated average of the seven highest values. Elimination of the two lowest values allows for possible wire surface defects, compound surface defects, technical error, or effects in the curing and/or heat aging of the end cords. The results for the rubber compositions tested are set forth in Table I below.

TABLE I

| Example Number | 1 | 2 | 3 | 4 | 5 | 6 | 7 | 8 | 9 | 10 |
|---|---|---|---|---|---|---|---|---|---|---|
| Natural Rubber | 100.0 | 100.0 | 100.0 | 100.0 | 100.0 | 100.0 | 100.0 | 100.0 | 100.0 | 100.0 |
| HAF Black | 45.0 | 45.0 | 45.0 | 45.0 | 45.0 | 45.0 | 45.0 | 45.0 | 45.0 | 45.0 |
| Zinc Oxide | 5.0 | 5.0 | 5.0 | 5.0 | 5.0 | 5.0 | 5.0 | 5.0 | 5.0 | 5.0 |
| Tarene #30[1] | 5.0 | 5.0 | 5.0 | 5.0 | 5.0 | 5.0 | 5.0 | 5.0 | 5.0 | 5.0 |
| Stearic acid | 1.0 | 1.0 | 1.0 | 1.0 | 1.0 | 1.0 | 1.0 | 1.0 | 1.0 | 1.0 |
| Santoflex 13[2] | 1.0 | 1.0 | 1.0 | 1.0 | 1.0 | 1.0 | 1.0 | 1.0 | 1.0 | 1.0 |
| Insoluble Sulfur | 3.0 | 3.0 | 3.0 | 3.0 | 3.0 | 3.0 | 3.0 | 3.0 | 3.0 | 3.0 |
| NOBS Special[3] | .95 | .95 | .95 | .95 | .95 | .95 | .95 | .95 | .95 | .95 |
| Resorcinol | — | 2.50 | 1.25 | 1.25 | 1.25 | 1.25 | 1.25 | 1.25 | 1.25 | 1.25 |
| HMT | — | 1.60 | .80 | .80 | .80 | .80 | .80 | .80 | .80 | .80 |
| Manobond C[4] | — | — | 1.50 | 1.50 | 1.50 | 1.50 | 1.50 | 1.50 | 1.50 | 1.50 |
| Magnesium Oxide | — | — | — | .5 | 1.0 | 2.0 | 4.0 | — | — | — |
| Magnesium Carbonate | — | — | — | — | — | — | — | 4.2 | — | — |

TABLE I-continued

| Example Number | 1 | 2 | 3 | 4 | 5 | 6 | 7 | 8 | 9 | 10 |
|---|---|---|---|---|---|---|---|---|---|---|
| Magensium Phospate | — | — | — | — | — | — | — | — | 8.6 | — |
| Magnesium Hydroxide | — | — | — | — | — | — | — | — | — | 2.9 |
| Total Parts by Weight | 160.95 | 165.05 | 164.5 | 165.0 | 165.5 | 166.5 | 168.5 | 168.7 | 173.1 | 167.4 |
| Original Adhesion | 231 | 160 | 275 | 245 | 296 | 400 | 356 | 273 | 299 | 314 |
| Adhesion after aging 48 hours at 100° C. | 129 | 92 | 111 | 153 | 141 | 171 | 153 | 140 | 109 | 123 |

[1] A "pine tar" made by Natro Chem, Inc.
[2] N-1,3-Dimethylbutyl-N' phenyl-p-phenylenediamine made by Monsanto.
[3] N-oxydiethylene-2-benzothiazylsulfenamide made by American Cyanamid Co.
[4] Cobalt versatate-boron oxy complex made by Manchem Ltd.

Referring to Table I and specifically to Examples 3 and 4, it can be seen that the retention after thermal aging of the high level of adhesion obtained by compounding the rubber with a cobalt versatate-borate complex and only 0.5 parts of magnesium oxide per hundred parts of rubber showed a marked improvement of greater than 37 percent over the rubber composition in which no magnesium compound was present. By increasing the amount of magnesium oxide to 2.0 parts per hundred parts of rubber in Example 6, the adhesion after thermal aging was increased by more than 54 percent. Similar improvements in retention of adhesion after thermal aging were obtained with other magnesium compounds in Examples 8 and 10. In Example 9, a magnesium compound exemplary of the type which is unsuitable for use in the practice of the present invention was added to the rubber composition. A lower value of adhesion was obtained because the magnesium phosphate used was in a relatively large particulate form, was crystalline in nature and was not compatible with the rubber as compared with the powder form in which rubber compounding chemicals are usually added to rubber compositions. As will be appreciated by one skilled in the art, in order for a magnesium compound to be effective as an electron donor, it must be in a form which is compatible with the rubber and in a form having a high surface area and thus conducive to formation of the novel complex.

What is claimed is:

1. A rubber composition comprising a highly unsaturated rubber, a magnesium compound capable of donating electrons and a carboxylated cobalt oxy metal complex comprising at least one metal atom selected from Groups IIIA, IIIB, IVA, IVB, VA and VB of the Periodic Table, at least one cobalt atom, said metal and cobalt atoms being linked through oxygen atoms, at least one acyloxy radical attached to a cobalt atom, and any residual valences of said complex being satisfied by acyloxy, aryloxy or alkoxy radicals, said magnesium compound and said cobalt complex being used in small amounts which are sufficient for obtaining a high level of adhesion between the rubber and a metal surface and improving the retention of such adhesion after thermal aging.

2. A composition as claimed in claim 1 wherein the magnesium compound is magnesium oxide.

3. A composition as claimed in claim 1 wherein the metal atom is boron.

4. A composition as claimed in claim 3 wherein the magnesium compound is magnesium oxide.

5. A composition as claimed in claim 3 wherein the carboxylated cobalt oxy metal complex has the formula

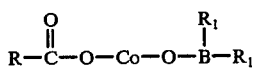

wherein R is a straight chain organic radical having at least 7 carbon atoms, and $R_1$ is an alkoxy, aryloxy, acyloxy or

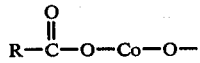

radical.

6. A composition as claimed in claim 5 wherein the magnesium compound is magnesium oxide.

7. A composition as claimed in claim 5 wherein R has from 9 to 11 carbon atoms.

8. A composition as claimed in claim 7 wherein the magnesium compound is magnesium oxide.

9. A composition as claimed in claim 3 wherein the carboxylated cobalt oxy metal complex has the formula

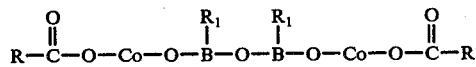

wherein R is a straight chain organic radical having at least 7 carbon atoms, and $R_1$ is an alkoxy, aryloxy, acyloxy or

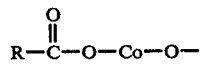

radical.

10. A composition as claimed in claim 9 wherein the magnesium compound is magnesium oxide.

11. A composition as claimed in claim 9 wherein R has from 9 to 11 carbon atoms.

12. A composition as claimed in claim 11 wherein the magnesium compound is magnesium oxide.

13. A method for improving the retention of adhesion after thermal aging of a rubber composition to a metal surface comprising compounding a highly unsaturated rubber with a magnesium compound capable of donating electrons, and a carboxylated cobalt oxy metal complex comprising at least one metal atom selected from Groups IIIA, IIIB, IVA, IVB, VA and VB of the Periodic Table, at least one cobalt atom, said metal and cobalt atoms being linked through oxygen atoms, at least one acyloxy radical attached to a cobalt atom, and any residual valences of said complex being satisfied by acyloxy, aryloxy or alkoxy radicals, said magnesium compound and said cobalt complex being used in small amounts which are sufficient for obtaining a high level of adhesion between the rubber and the metal surface and improving the retention of such adhesion after thermal aging, and contacting the rubber composition with the metal surface.

14. A method as claimed in claim 13 wherein the magnesium compound is magnesium oxide.

15. A method as claimed in claim 9 wherein the metal surface is selected from the group consisting of steel, copper, zinc, copper alloys, zinc alloys, and copper and zinc alloys.

16. A method as claimed in claim 15 wherein the magnesium compound is magnesium oxide.

17. A method as claimed in claim 15 wherein the metal atom is boron.

18. A method as claimed in claim 17 wherein the magnesium compound is magnesium oxide.

19. A method as claimed in claim 17 wherein the carboxylated cobalt oxy metal complex has the formula

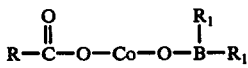

wherein R is a straight chain organic radical having at least 7 carbon atoms, and $R_1$ is an alkoxy, aryloxy, acyloxy or

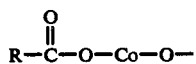

radical.

20. A method as claimed in claim 19 wherein the magnesium compound is magnesium oxide.

21. A method as claimed in claim 19 wherein R has from 9 to 11 carbon atoms.

22. A method as claimed in claim 21 wherein the magnesium compound is magnesium oxide.

23. A method as claimed in claim 17 wherein the carboxylated cobalt oxy metal complex has the formula

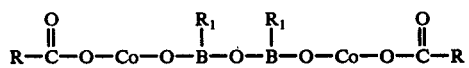

wherein R is a straight chain organic radical having at least 7 carbon atoms, and $R_1$ is alkoxy, aryloxy, acyloxy or

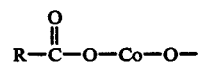

radical.

24. A method as claimed in claim 23 wherein the magnesium compound is magnesium oxide.

25. A method as claimed in claim 23 wherein R has from 9 to 11 carbon atoms.

26. A method as claimed in claim 25 wherein the magnesium compound is magnesium oxide.

27. A composition comprising a magnesium compound capable of donating electrons and a carboxylated cobalt oxy metal complex comprising at least one metal atom selected from Groups IIIA, IIIB, IVA, IVB, VA and VB of the Periodic Table, at least one cobalt atom, said metal and cobalt atoms being linked through oxygen atoms, at least on acyloxy radical attached to a cobalt atom, and any residual valences of said complex being satisfied by acyloxy, aryloxy or alkoxy radicals, said magnesium compound and said cobalt complex being used in small amounts which are sufficient for obtaining a high level of adhesion between a highly unsaturated rubber and a metal surface and improving the retention of such adhesion after the thermal aging when the composition is used in the rubber.

28. A composition as claimed in claim 27 wherein the magnesium compound is magnesium oxide.

29. A composition as claimed in claim 27 wherein the metal atom is boron.

30. A composition as claimed in claim 29 wherein the magnesium compound is magnesium oxide.

31. A composition as claimed in claim 29 wherein the carboxylated cobalt oxy metal complex has the formula

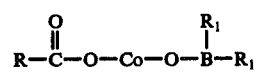

wherein R is a straight chain organic radical having at least 7 carbon atoms, and $R_1$ is an alkoxy, aryloxy, acyloxy or

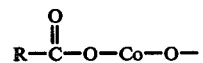

radical.

32. A composition as claimed in claim 31 wherein the magnesium compound is magnesium oxide.

33. A composition as claimed in claim 31 wherein R has from 9 to 11 carbon atoms.

34. A composition as claimed in claim 33 wherein the magnesium compound is magnesium oxide.

35. A composition as claimed in claim 29 wherein the carboxylated cobalt oxy metal complex has the formula

wherein R is a straight chain organic radical having at least 7 carbon atoms, and $R_1$ is an alkoxy, aryloxy, acyloxy or

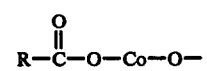

radical.

36. A composition as claimed in claim 35 wherein the magnesium compound is magnesium oxide.

37. A composition as claimed in claim 35 wherein R has from 9 to 11 carbon atoms.

38. A composition as claimed in claim 37 wherein the magnesium compound is magnesium oxide.

* * * * *